(12) United States Patent
Poole

(10) Patent No.: US 6,314,445 B1
(45) Date of Patent: Nov. 6, 2001

(54) NATIVE FUNCTION CALLING

(75) Inventor: Stephen Poole, Hampshire (GB)

(73) Assignee: International Business Machines Coprporation, Armonk, NY (US)

( * ) Notice: Subject to any disclaimer, the term of this patent is extended or adjusted under 35 U.S.C. 154(b) by 0 days.

(21) Appl. No.: 09/128,082

(22) Filed: Aug. 3, 1998

(51) Int. Cl.$^7$ .................................................. G06F 17/00
(52) U.S. Cl. .............................................. 709/1; 712/202
(58) Field of Search ............................... 709/1; 712/200, 712/201, 203, 225, 226, 227; 717/5

(56) References Cited

U.S. PATENT DOCUMENTS

| | | | |
|---|---|---|---|
| 5,761,477 | * | 6/1998 | Wahbe et al. ............................. 709/1 |
| 5,875,336 | * | 2/1999 | Dickol et al. ............................. 717/5 |
| 6,026,485 | * | 2/2000 | O'Conner et al. .................... 712/226 |
| 6,065,108 | * | 5/2000 | Tremblay et al. .................... 712/201 |
| 6,088,786 | * | 7/2000 | Feierbach et al. .................... 712/200 |
| 6,112,018 | * | 8/2000 | Tran et al. ............................. 712/202 |
| 6,125,439 | * | 9/2000 | Tremblay et al. .................... 712/202 |
| 6,148,391 | * | 11/2000 | Petrick ................................. 712/202 |
| 6,151,618 | * | 11/2000 | Wahbe et al. ............................. 709/1 |
| 6,167,565 | * | 12/2000 | Kanamori ................................. 717/5 |

OTHER PUBLICATIONS (no author given), "Inner Classes Specification," Sun Microsystems White Paper, Feb. 10, 1997 release, pp. 1–29.*

(Gosling, James; Henry McGilton, "The Java Language Environment—A White Paper," Sun Microsystems white paper, Oct. 1995, pp. 1–85.*

Horstmann, Cay S., "Java Programming with Sun's Java Development," C ++ Report, Mar. 1996, pp. 63–70.*

* cited by examiner

*Primary Examiner*—St. John Courtenay III
(74) *Attorney, Agent, or Firm*—Lauren C. Bruzzone

(57) ABSTRACT

A method and system of processing within a Java Virtual Machine on a computer system, a native function call instruction of a dynamic parameter set type and contained in a Java byte code application. The method comprises the steps of; interpreting the byte code representing a native function call instruction of the dynamic parameter set type; storing the parameters of the variable parameter set in an array; using the computer system to process the native function call as a fixed parameter set type using the array as the fixed parameter set. Before the function is called the computer system transfers the parameters from the array to a stack used by the native function.

10 Claims, 7 Drawing Sheets

NATIVE FUNCTION CALLING

FIELD OF INVENTION

This invention relates to a system and method for providing a native function call facility. In particular it relates to a system and method for providing a native function call facility in a Java Virtual Machine (JVM) for platforms that do not have a native function call facility for dynamic parameter sets.

BACKGROUND OF INVENTION

IBM's AS/400 computer platform is one of IBM's more successful products, it has been available since the late seventies and has survived in the market for much longer than most other business hardware platforms. One reason for its success is that it incorporates a virtual machine layer as an interface between the AS/400 computer and AS/400 applications. This allows the platform to be defined by the virtual machine software rather than the platform hardware and the advantage follows that existing software need not be rewritten for new hardware. As hardware advances become available they may be incorporated into the AS/400 computer together with corresponding changes in the virtual machine layer which make the platform appear the same as before. Business software tends to be in use for long periods of time and this feature is particularly attractive for business users.

The virtual machine layer defines an independent virtual machine instruction set which maps on to the machine instructions of the computer; it is simple to use because it is high level but has the disadvantage that some machine instructions of the AS/400 computer are no longer available. In particular there are no machine stack manipulation instructions in the virtual machine instruction set and the address of a machine stack pointer may not be accessed or changed directly by an instruction from the AS/400 virtual machine set. Furthermore the AS/400 virtual machine does not allow function calls with dynamic parameter sets, where the parameters are assumed to be stored on a stack and only the signature or format of the parameters is known.

The idea of platform independence is not exclusive to the IBM AS/400 and has also been developed in another area. In particular the Java programming language was originally designed for use in the consumer electronics industry so that microprocessors in kettles, videos and cameras could be programmed in the same language. This platform independent property in the Java language was found to be ideal for programs distributed on the internet where different platforms are connected together in a network. Applications are written in high level Java source code, compiled into Java byte code by a Java compiler and interpreted by the Java Virtual Machine (JVM). Its main advantage is that it is 'write once run anywhere', that is, platform independent and portable.

IBM's AS/400 and Sun Microsystem's Java therefore have a virtual machine interface in common and when used together, a Java application running on an AS/400 uses a JVM to interface to the AS/400 virtual machine which interfaces to the AS/400 computer. This combination is advantageous in that it allows Java applications to run on present and future AS/400 computers. However a problem exists when the JVM needs to access the stack pointer of the AS/400 computer: since there is no facility in the AS/400 virtual machine to do this, there can be no direct access from the JVM.

This is a particular problem for interpreting native function call instructions in the JVM with respect to dynamic parameter sets. A native function call instruction instigates a jump to the address in memory outside the Java environment of a function indicated by a function identifier. The function identifier is used to find the address in the computer system where the function resides. The native function may have an operating system address and an operating system lookup table may allow the address to be located.

A native call is a procedure call to code external to the Java environment, for example to the platform operating system OS/400 or another platform specific routine. The Java specification states that native calls should be allowed although if implemented the Java application containing it will not be 100% Java and portable to other platforms. Native calls are necessary so that existing legacy systems may be integrated with new Java applications, for example a Java interface to an existing database application.

The Java native call instruction expects that the parameters required by the function will be on a Java stack and will not be part of the instruction. The format in which the function is expecting the parameter is defined in the instruction by a signature. When processing the instruction the JVM would normally retrieve the parameter from the Java stack and place it on the machine stack in its respective format as required by the native function and indicated by the signature.

A function call instruction has a dynamic parameter set when the parameters the function requires are stored in a stack before the function is called. This is as opposed to a function call instruction with a fixed set of parameters when the parameters are included in the instruction. An example of a Java function call instruction with a dynamic parameter set would be 'Invoke native "Fred/A(CICI)VI"' where 'Fred/A' is the function identifier '(CICI)' is the parameter signature and 'V' is the return value. The parameters a, b, c, d may be stored on the stack before the instruction is processed. The parameter signature '(CICI)' indicates that the function requires a character (C), integer (I), character (C), integer (I) sequence of parameters from the stack. An example of a C language function call instruction with a fixed parameter set would be Fred A (a,b,c,d),V' where (a,b,c,d) are parameters declared as character, integer, character, integer.

A JVM running directly on a hardware platform without an intermediary virtual machine can usually access a stack pointer in the machine directly. When the JVM interprets a native function instruction it fetches the stack pointer from the machine register and loads the parameters of the dynamic function instruction directly into memory (the machine stack) pointed at by the stack pointer. The JVM then jumps to the address of the function with the stack pointer pointing at the parameters in memory. This is where the difficulty lies since the AS/400 virtual machine will not allow the JVM to manipulate the machine stack directly and the JVM does not have direct access to the AS/400 computer.

A known way of dealing with such a problem would be to write additional native function handling code which would directly access the underlying machine level as in the prior art solution. This code would place the selected parameters on the machine stack by accessing stack manipulation functionality in the machine. However, in the case of the AS/400, the architecture is such that direct calls to the AS/400 machine would bypass the intended control and precautions of the system and could cause potential problems.

SUMMARY OF INVENTION

According to one aspect of the invention there is provided a method of processing, within a virtual machine on a computer system, a native function call instruction with a dynamic parameter set, said method comprising the steps of;

interpreting code representing a native function call instruction;

storing the parameters of said dynamic parameter set in an array;

using the computer system to process the native function call with a fixed parameter set as represented by the array;

whereby the computer system transfers the parameters from the array to a machine stack used by the native function before the native function is called.

By using the functionality of the underlying computer system the method allows the JVM to avoid the use of stack manipulation machine instructions.

In a preferred embodiment the method further comprises acquiring a parameter set signature from the instruction and loading the parameters into the array in a format defined by the parameter set signature. Most preferably the parameters are loaded into the array in a contiguous fashion.

According to a second aspect of the invention there is provided a system of processing, within a virtual machine on a computer system, a native function call instruction with a dynamic parameter set, said system comprising:

means for interpreting the code representing a native function call instruction;

means for storing the parameters of said dynamic parameter set in an array;

means for using the computer system to process the native function call with a fixed parameter set as represented by the array;

whereby the computer system transfers the parameters from the array to a stack used by the native function before the native function is called.

BRIEF DESCRIPTION OF THE DRAWINGS

In order to promote a fuller understanding of this and other aspects of the present invention, an embodiment will now be described, by way of example only, with reference to the accompanying drawings in which.

DETAILED DESCRIPTION OF PREFERRED EMBODIMENT

A Java Virtual Machine (JVM) 10A is supported by a processor 12A with a dedicated operating system 14A (see FIG. 1A), for example Intel Corporation's Pentium processor and Microsoft Corporation's Windows 95 operating system. A Java application 16A is processed by the JVM 10A using the processor 12A and functions in the operating system 14A. For instance the JVM 10A uses registers and stack of the processor 12A to perform operations needed by the application 16A.

Figure 1:
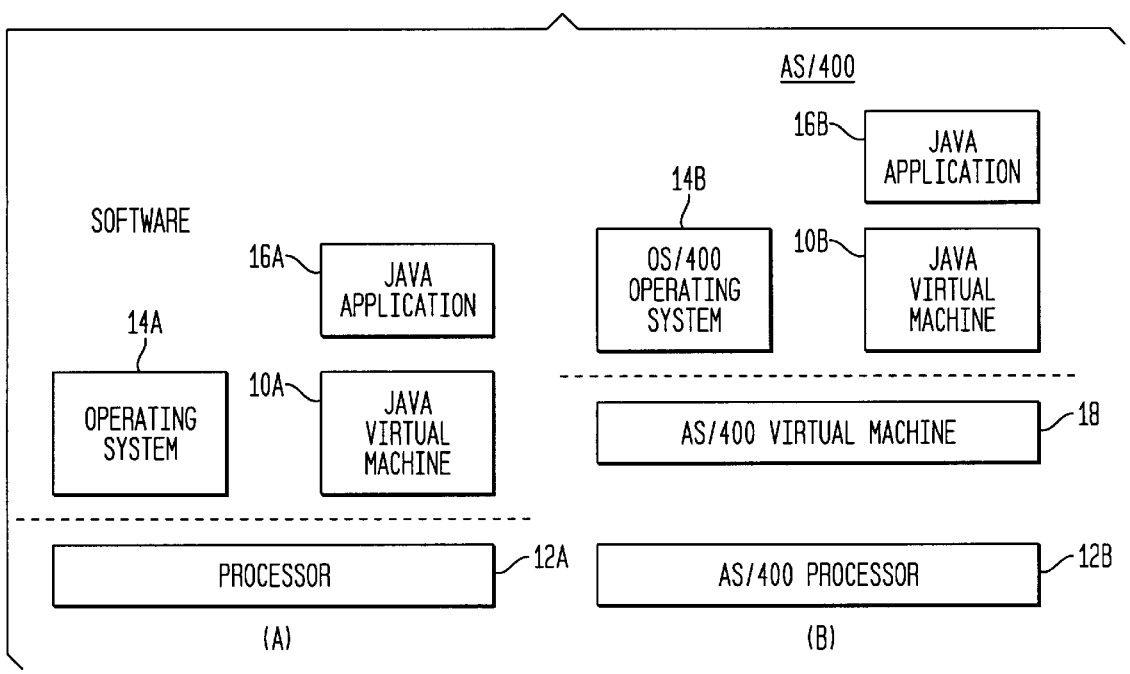
FIGS. 1A and 1B are schematic representations of a prior art Java system and a AS/400 Java system.

In contrast, an AS/400 JVM 10B of the embodiment is supported on a AS/400 virtual machine 18 with an OS/400 operating system 14B (see FIG. 1B). The AS/400 virtual machine 18 is itself supported by an AS/400 processor 12B. The AS/400 JVM 10B uses resources in the operating system 14B and in the AS/400 virtual machine 18 but not directly in the AS/400 processor 12B. However the AS/400 virtual machine 18 generally maps the resources of the AS/400 processor 12B so that the AS/400 JVM 10B indirectly uses the resources in the AS/400 processor 12B. A consequence of this is that if there is no mapping of an AS/400 processor resource then the JVM 10B can not use the resource.

The AS/400 JVM 10B uses a virtual machine resource by jumping to such a function or process, for instance using procedures defined in the Application Programming Interface (API) of the AS/400 virtual machine 10B. On the other hand, a processor resource is a function performed in respect of a machine code instruction; the AS/400 virtual machine 18 uses processor resources in the AS/400 processor 12B by using machine instructions. Virtual machine resources in the AS/400 virtual machine 18 can correspond (or map) to equivalent processor instructions 10B with some exceptions. In this case virtual machine resources cannot directly access a processor stack as can the processor.

Figure 2:
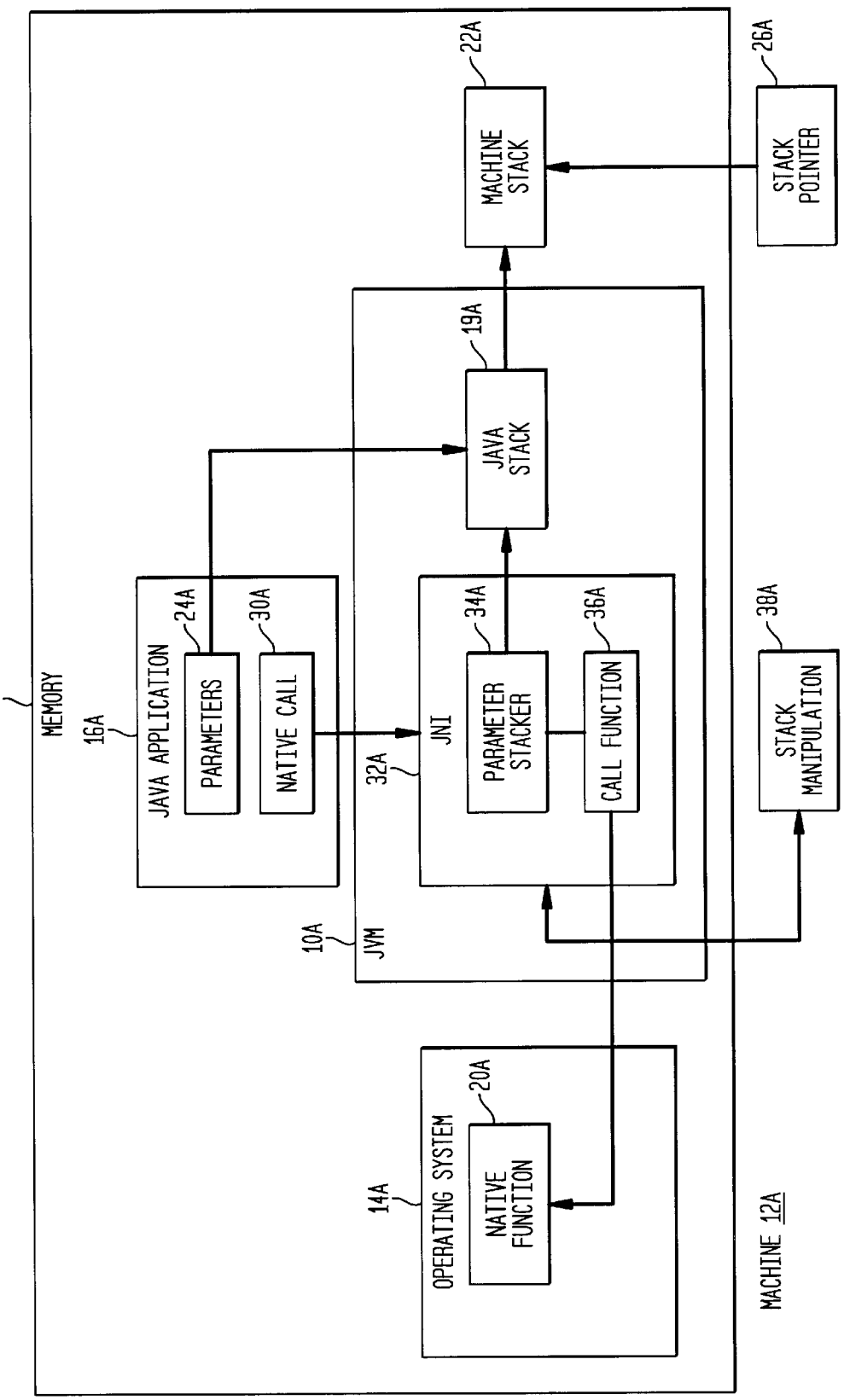
FIG. 2 is a more detailed schematic representation of the prior art Java system of FIG. 1A.

A detailed view of a prior art JVM which would run directly on a processor is shown in FIG. 2. The system comprises a machine processor 12A with memory 28A, the memory 28A holds the JVM 10A, the Java application 16A, a Java stack 19A, the operating system 14A and a machine stack 22A. The Java application 16A is a program in the form of a sequence of byte codes; each byte code may indicate amongst other things a JVM instruction or a parameter 24A for an instruction. One type of instruction in the program is a native function call instruction 30A. Preceding this instruction are instructions relating to the parameters 24A to be used with the function call; the instructions would load the parameters 24A into the Java stack 19A. The parameters 24A may be variable indicators or the actual values. The JVM 10A comprises a native function handling component, the Java Native Interface (JNI) 32A including a parameter stacking component 34A and a call function component 36A. The parameter stacking component 34A retrieves the parameters 24A from the Java stack 19A and places the values in the machine stack 22A. The call function component 36A acquires the address of the native function 20A and makes a jump to that address.

The operating system 14A,14B includes functionality for the input and output of the system to storage systems, output to displays and printers, and general maintenance functions. Some functions within the operating system 14A,14B are used by external programs and are called native functions 20A,20B (see FIG. 2 and FIG. 4); this is because they are specific to the system and the same function call would not work on any other system. For instance a call to a function in IBM's OS/2 for the placing a screen icon on a window would not work in IBM's OS/400 because of the differences in the program code, protocol and address. A native function 20A,20B need not necessarily be an operating system function but may be any function which is specific to that platform.

Figure 4:
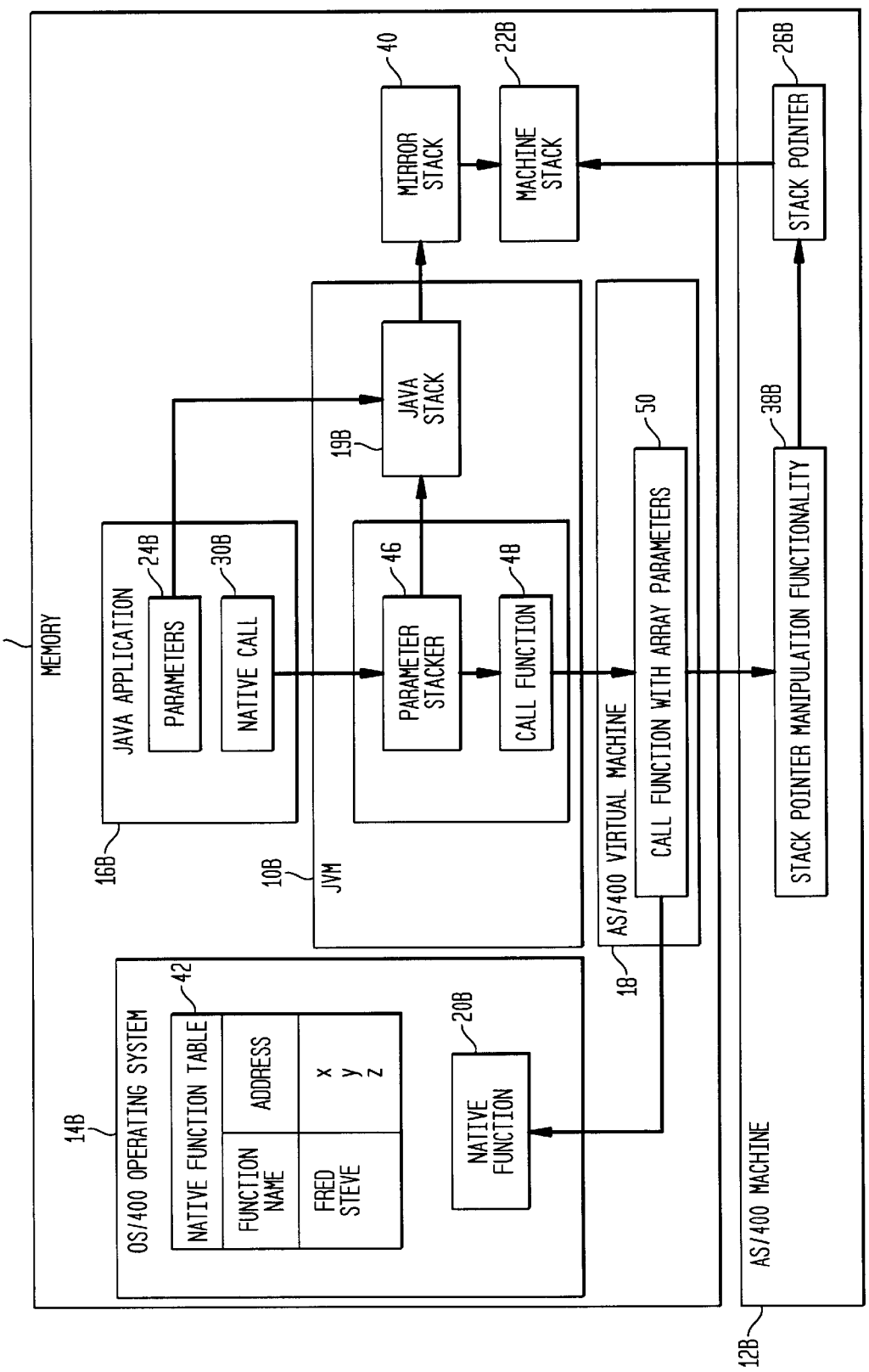
FIG. 4 is a more detailed schematic representation of the AS/400 Java system of Figure 1B.

In this example the native function 20B is shown in the OS/400 operating system 14B (see FIG. 4). When a call is made to the native function 20B, processing jumps to the address of the native function 20B, and the parameters required by the native function are all assumed by the native function to be in the machine stack 22B in the format required by the function. For instance, the Java application may wish to place an icon on a window, the address of the icon placing function, the icon details, position on the window and data format signature of the function are placed in an instruction. The interpreter places the data on the machine stack in the correct format as indicated by the signature and a jump is made to address in the instruction.

The machine stack 22A,22B (see FIG. 2 and FIG. 4) is reserved space in memory used by the machine for storing data and addresses, in particular it stores the parameters 24A,24B that will be used for a native function. A stack pointer 26A,26B in the machine holds the address of the last data placed into the stack and is updated each time data is placed onto or taken away from the stack. In this example the stack is a last in first out stack but other types of stack system may be used. Parameters are placed on the stack by accessing stack manipulation functionality in the machine using stack manipulation instructions. These manipulation functions include 'pushing' data onto the stack and incrementing the stack pointer, 'popping' data from the stack and decrementing the stack pointer, retrieving and changing the stack pointer directly.

Figure 3:
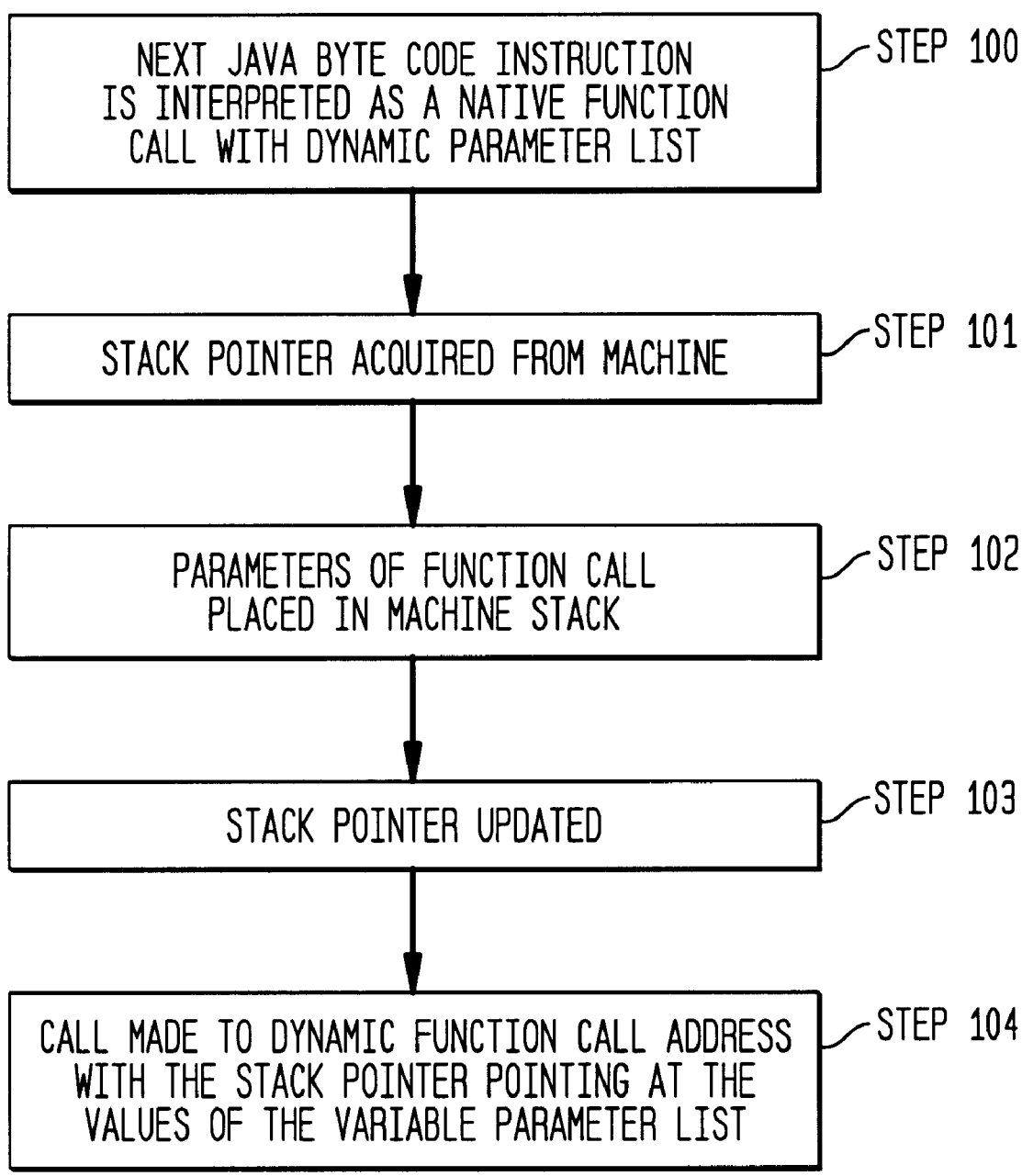
FIG. 3 is a process chart of the steps used by the prior art Java system.

The operation of the prior art JVM system running directly on a processor in regard to native function calls is as follows (see FIG. 3). The JVM 10A interprets a byte code indicating a native function call instruction 30A and processing moves to the JNI 32A (step 100). The parameters 24A of the function are acquired from the Java stack 19A. Each of the parameters 24A is placed on the machine stack 22A in the order and format expected by the native function 20A. This may be performed directly by using 'push' machine instructions or indirectly by acquiring the address of the stack pointer 26A (step 101), loading the memory address pointed to by the stack pointer (step 102) and updating the stack pointer accordingly (step 103) using stack manipulation functionality in the machine 12A. The address of the native function 20A is acquired from the byte code instruction by the call function component and a jump is made to that address (step 104).

A detailed view of the Java system of the embodiment is shown in FIG. 4. The system comprises an AS/400 machine 12B and memory 28B. The AS/400 machine 12B comprises stack manipulation functionality 38B for accessing a stack pointer 26B and 'pushing' or 'popping' data from a stack 22B in memory. The memory comprises an AS/400 virtual machine 18, an OS/400 operating system 14B, a JVM for AS/400 10B, a Java application 16B, a Java stack 19B, a machine stack 22B and memory (mirror stack) 40 reserved for saving variables in an array.

The Java application 16B comprises byte code instructions. Included within the application is a native function call instruction 30B. Associated parameters 24B precede the native function call 30B in instructions which place them on the Java stack 19B. The OS/400 operating system 14B contain native function 20B that may be used by the Java application 16B to enhance the performance of the application. The JVM contains code for handling the native function call instructions and in particular for native function call instructions, this code is part of the Java Native Interface (JNI) 32B. When the JVM interprets a byte code indicating a native function call instruction it passes control to the JNI 32B. The JNI 32B comprises components for stacking the parameters 46 and for calling the function 48. The parameters for the function are already in the Java stack 19B when the JNI is initiated.

The parameter stacker component 46 uses the signature acquired from the instructions and the parameters from the Java stack 19B to create a mirror stack 40, independent of the machine stack 22B, containing the parameters in the form of an array. The parameters are placed in a mirror stack 40 in the format expected by the selected function and as indicated by the signature. This fixes the parameters needed by the function in any array. The next component is the call function component 48 which calls a call function component 50 in the AS/400 virtual machine using the array stack as a substitute for the parameters. The call function component 50 allows a fixed set of parameters such as the array to be included in the instruction.

Figure 5:
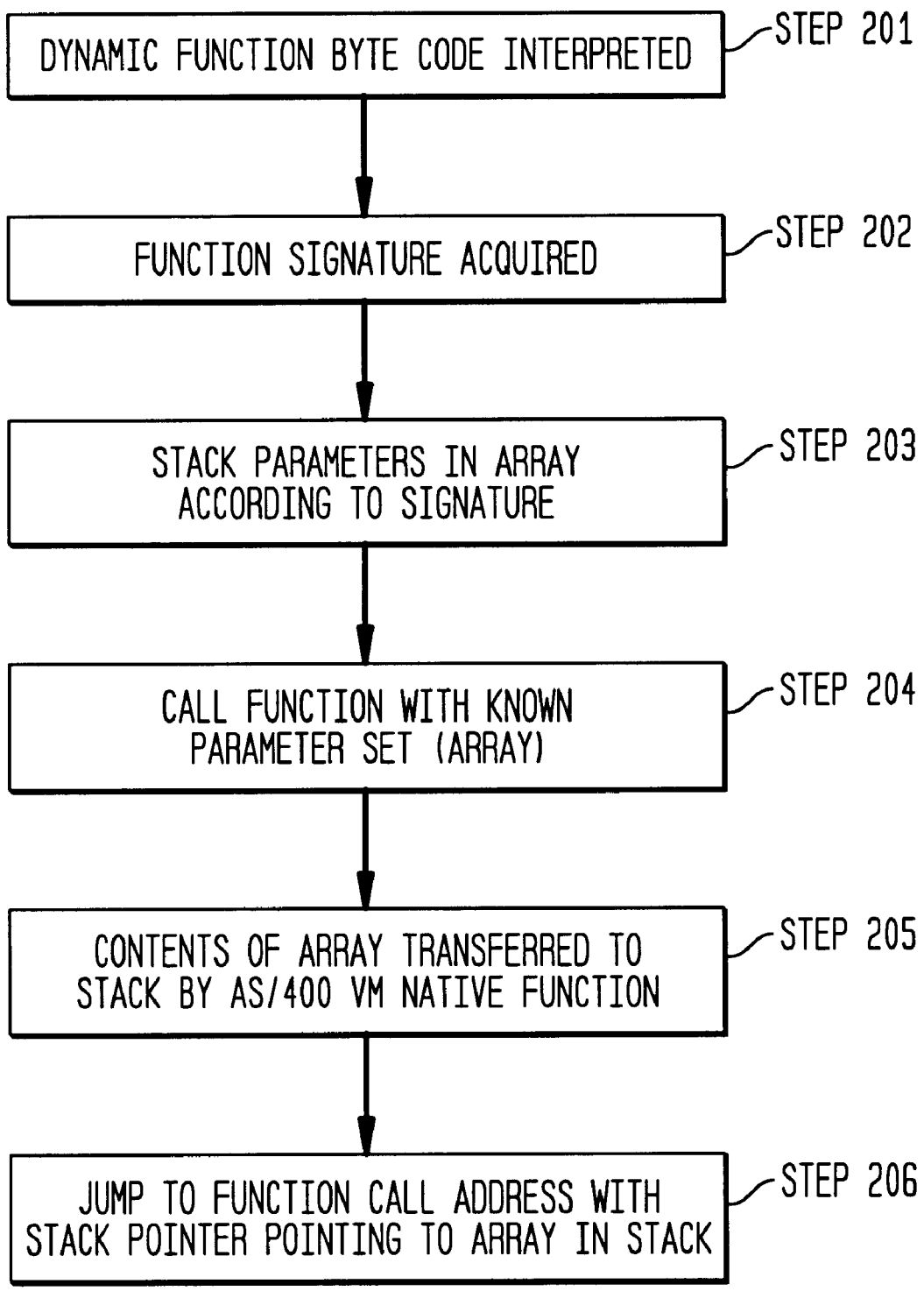
FIG. 5 is a process chart of the steps used by the AS/400 Java system.

The operation of the embodiment is as follows (see FIG. 5). The JVM 10B interprets a byte code for processing a native call function instruction (step 210). Control is passed to the JNI and the function signature (step 202) is acquired. Next the parameter stacking component acquires the parameters from the Java stack and stores them in memory as an array according to the format defined by the signature, the memory forms a mirror stack 40 (step 203). Control is passed to call function component 48, this uses the native call functionality in the AS/400 virtual machine to make native interface calls using a fixed set of parameters (step 204). In this case the fixed set of parameters is the array in the mirror stack. The call native functionality in the AS/400 virtual machine interprets the parameters as fixed in the array and uses stack manipulation functionality in the AS/400 machine to transfer the array or mirror stack to the machine stack (step 205). Then the native function address is jumped to with the machine stack pointer pointing to the parameters in the machine stack (step 136). The native function may then be processed with its parameters fixed and stored in a known location and in the format it expects.

Figure 6:
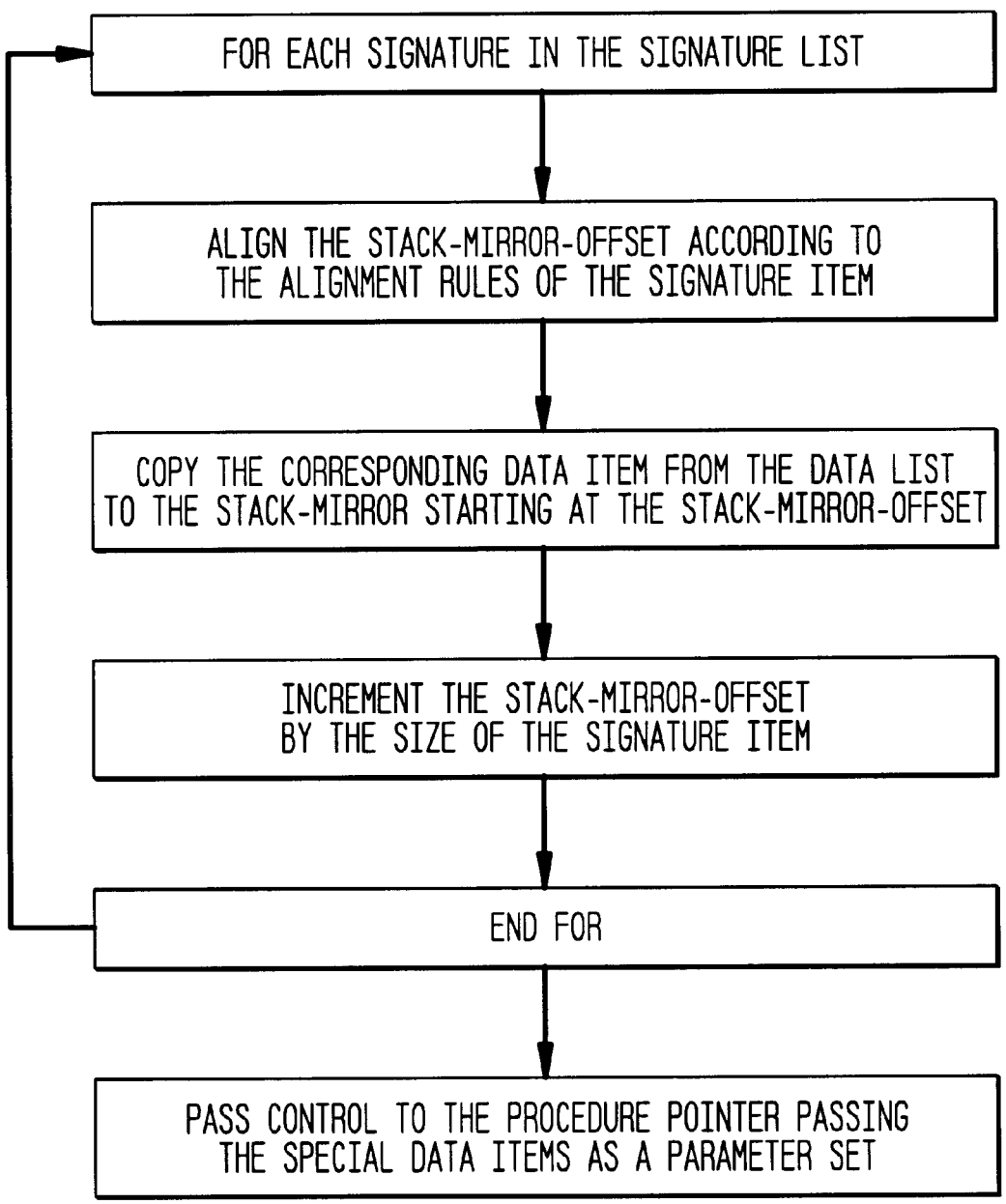
FIG. 6 is a schematic diagram of a pseudo code example of the embodiment.

FIG. 6 is a pseudo code example of the embodiment. In this example no account is taken of any error detection or recovery and makes reference to a special-data-item. The only requirement on this data type is that an array of such items are placed upon the mirror stack in a contiguous manner. The size of this item is not relevant.

The inputs used in the pseudo code are: an executable reference to the procedure to be called—the procedure—pointer; a list of data items (data-item) to be passed to this procedure—the data-list; and a list of the types of data (signature-item) passed in the above list—the signature-list.

The variables used in this example are: an area of storage that can be accessed at an individual entry level—the stack-mirror; the same area of storage that contains the stack-mirror mapped as an array of special-data-item's—the special-array; and an offset from the start of this area—the stack-mirror-offset.

A worked example follows using a simplified version of a stack based machine to ensure clarity. The data types available in this simplified machine are as follows: CHAR—a single byte type that has no alignment requirements; INT—a two byte type that must be aligned on a two byte boundary; and POINTER—a four byte type that must be aligned on a four byte boundary. The special-data-item properties required are satisfied by the POINTER data type. A dynamic call to a routine called 'FRED' is required and the signature-list of the parameters that 'FRED' requires is INT, POINTER, CHAR, INT. The data-list contains data to be passed to 'FRED' and contains the following arbitrary values and their hexadecimal equivalents (where applicable)—20100 (0x4E84), 0xE7AA75FF, 'W' (0x57), 0x8855BBDD.

Figure 7A:
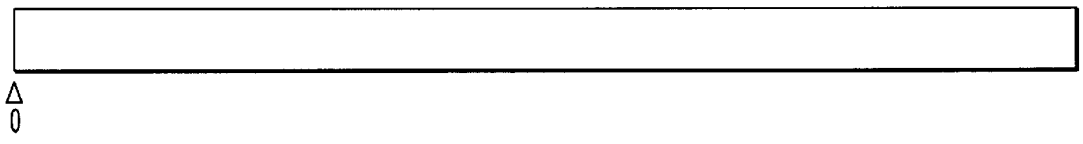
FIG. 7A to 7D are schematic representations of an array stack used by the AS/400 Java system.
Figure 7B:
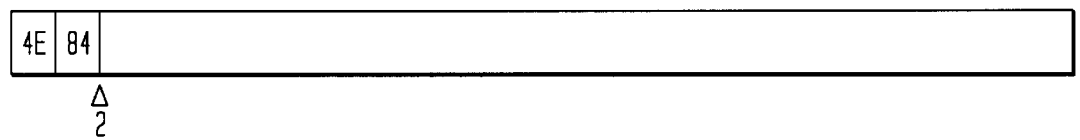

Initially the stack-mirror holds no data and the stack-mirror-offset is set at zero (see FIG. 7A). Each item in the data-list is examined according to the corresponding entry in the signature-list. The first item is an INT, which requires an alignment boundary of 2 bytes. Since the stack-offset is 0 there is no need to do any alignment. The data from the data-list item is copied into the stack-mirror and the stack-mirror-offset is incremented by the size of the INT, which is two (see FIG. 7B).

Figure 7C:
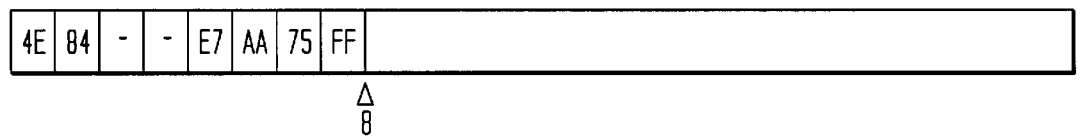
Figure 7D:
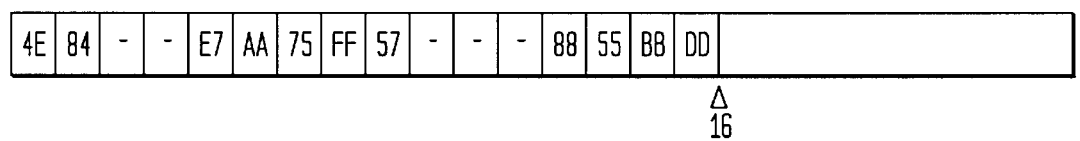

The second item is of type POINTER and has a boundary alignment of four. Since the current stack-mirror-offset value is not divisible by four, it must be aligned before the data is copied. In this case the stack-mirror-offset is incremented by two to bring it to four. The data from the data-list is copied and then the stack-mirror-offset is incremented by the size of the item, in this case four (see FIG. 7C). Repeating this process for the remaining items in the data-list, the final status of the stack mirror is shown in FIG. 7D.

Having built the stack-mirror, it is now necessary to get this data onto the real calling stack in such a way that the data organisation within the mirror is not disturbed and that its alignment is held. To do this the stack mirror is treated as being an array of POINTERs. Conceptually allowing the data in the stack-mirror to be seen thus:

Array Entry 1—0x4E840000
Array Entry 2—0xE7AA75FF
Array Entry 3—0x57000000
Array Entry 4—8855BBDD Due to the properties of the special-data-item type—i.e. that multiple elements of this type are placed on the real stack contiguously, when the call is made to 'FRED' with this array the data is copied onto the real stack so that the real stack now looks exactly like the contents of the stack-mirror. Routine 'FRED' can now access the data required as the real stack contains the data in the format and position that its parameter definition expects.

The JVM of the embodiment cannot directly access the stack pointer. When the JVM locates a Java native call function with dynamic parameters it loads the parameters of the call into memory (mirror stack) to form an array pointed at by an array pointer. The JVM then makes a non-dynamic call using the array as a fixed set of parameters. The action of the fixed parameter call loads the array directly into memory (the stack) pointed at by the stack pointer. The JVM then calls the address of the dynamic call function.

In summary there is described a method and system of processing within a Java Virtual Machine on a computer system, a native function call instruction of a dynamic parameter set type and contained in a Java byte code application. The method comprises the steps of; interpreting the byte code representing a native function call instruction of the dynamic parameter set type; storing the parameters of the variable parameter set in an array; using the computer system to process the native function call as a fixed parameter set type using the array as the fixed parameter set. Before the function is called the computer system transfers the parameters from the array to a stack used by the native function.

Now that the invention has been described by way of a preferred embodiment, various modifications and improvements will occur to those persons skilled in the art. Therefore it should be understood that the preferred embodiment has been provided as an example and not as a limitation. Although the embodiment has been described in terms of an IBM AS/400 system it will be appreciated by a skilled person that the invention is appropriate for any JVM which does not run directly on a machine but on a virtual machine. The embodiment has been described in terms of a system which is powered up and with dynamic memory loaded with the virtual machine code, the JVM code and the application code. However, it will be understood by one skilled in the art that the invention also covers an embodiment where the system is not actually powered up and the appropriate code is stored in a static memory such as a hard file or read only memory.

The invention is also appropriate to other applications that run on a virtual machine and also need to make native function calls, with dynamic parameter sets.

What is claimed is:

1. A method of processing, within a virtual machine on a computer system, a native function call instruction with a dynamic parameter set, said method comprising the steps of;
   interpreting code representing a native function call instruction;
   storing the parameters of said dynamic parameter set in an array;
   using the computer system to process the native function call with a fixed parameter set as represented by the array;
   whereby the computer system transfers the parameters from the array to a machine stack used by the native function before the native function is called.

2. A method as claimed in claim 1 further comprising:
   acquiring a parameter set signature from the instruction; and
   loading the parameters into the array in a format defined by the parameter set signature.

3. A method as claimed in claim 2 whereby said parameters are loaded into the array in a contiguous fashion.

4. A method as claimed in claim 3 whereby the virtual machine is a first virtual machine running on a second virtual machine comprising functionality for performing a native function call with a fixed parameter set.

5. A method as claimed in claim 4 wherein the fixed parameter set is a set of pointers.

6. A data processing system having a virtual machine, a native function call instruction with a dynamic parameter set, said system comprising:
   means for interpreting the code representing a native function call instruction;
   means for storing the parameters of said dynamic parameter set in an array;
   means for using the computer system to process the native function call with a fixed parameter set as represented by the array;
   whereby the computer system transfers the parameters from the array to a stack used by the native function before the native function is called.

7. A system as claimed in claim 6 further comprising:
   means for acquiring a parameter set signature from the native function call function instruction; and
   means for loading the parameters into the array in a format defined by the parameter set signature.

8. A system as claimed in claim 7 further comprising means for loading the parameters into the array in a contiguous fashion.

9. A system as claimed in claim 8 whereby the virtual machine is a first virtual machine running on a second virtual machine comprising the functionality for performing a native function call with a fixed parameter set.

10. A system as claimed in claim 9 wherein the fixed parameter set is a set of pointers.

* * * * *